United States Patent [19]

Hayashi

[11] Patent Number: 5,415,443
[45] Date of Patent: May 16, 1995

[54] PIPE WITH FLANGE FOR PIPE FITTING, PIPE FLANGE USED THEREWITH AND METHOD OF JOINING SAID PIPE WITH FLANGE WITH PIPE

[76] Inventor: Toshiomi Hayashi, 2-18-7, Ohmachinishi, Asaminami-ku, Hiroshima-shi, Hiroshima, Japan

[21] Appl. No.: 111,555

[22] Filed: Aug. 25, 1993

[30] Foreign Application Priority Data

Aug. 30, 1992 [JP] Japan .................. 4-273346

[51] Int. Cl.⁶ ........................................ F16L 23/024
[52] U.S. Cl. .................................. 285/405; 285/222; 29/511; 29/512
[58] Field of Search ............... 285/405, 222, 382.4, 285/334.5, 382, 382.1, 382.2; 29/507, 509, 512, 508, 511; 403/242, 285

[56] References Cited

U.S. PATENT DOCUMENTS

| | | | |
|---|---|---|---|
| 1,395,707 | 11/1921 | Grierson | 285/222 |
| 1,532,891 | 4/1925 | Draper | 29/511 |
| 1,591,183 | 7/1926 | Reynolds | 29/508 |
| 1,709,324 | 4/1929 | Runser | 29/511 |
| 1,742,793 | 1/1930 | Staples | 285/222 |
| 1,988,158 | 1/1935 | Brodell | 285/222 |
| 1,998,740 | 4/1935 | Schubenel | 285/222 |
| 2,099,026 | 11/1937 | Markel et al. | 285/222 |
| 2,164,629 | 7/1939 | Sibley | 285/222 |
| 2,464,506 | 3/1949 | Hirschfeld | 285/222 |
| 2,470,508 | 5/1949 | Maky | 285/334.5 |
| 3,786,730 | 1/1974 | Linderholm | 29/512 |
| 4,133,565 | 1/1979 | Shutt | 285/334.5 |
| 4,233,726 | 11/1980 | Williams . | |
| 4,547,943 | 10/1985 | Hoeffken | 285/222 |
| 5,277,457 | 1/1994 | Hayashi | 285/382.2 |

FOREIGN PATENT DOCUMENTS

| | | | |
|---|---|---|---|
| 2467976 | 4/1981 | France . | |
| 893155 | 10/1953 | Germany | 285/222 |
| 60-76231 | 4/1985 | Japan . | |
| 1-105088 | 4/1989 | Japan . | |
| 5033888 | 2/1993 | Japan | 285/382 |
| 7810581 | 2/1979 | Netherlands . | |
| 61069 | 4/1912 | Switzerland | 285/222 |
| 297122 | 5/1954 | Switzerland | 285/222 |
| 405461 | 2/1934 | United Kingdom . | |

*Primary Examiner*—Eric K. Nicholson
*Attorney, Agent, or Firm*—Oliff & Berridge

[57] ABSTRACT

A pipe flange is formed with an opening into which is fitted a pipe, and an annular groove which is coaxial with the opening and surrounds the same. A cylindrical is defined between the opening and the annular groove coaxially. A folding-back portion is led to the cylindrical portion and is adapted to retain one leading end of the pipe fitted into the opening. A pipe retaining portion is led to the folding-back portion and is folded back radially inwardly over the cylindrical portion in parallel therewith and is spaced apart therefrom by a predetermined distance. Therefore, the joining process can be simplified, and the work environment will not be contaminated. In addition, the joint strength and the air tightness can be enhanced. The pipe integral with the flange for pipe fitting is light in weight. Furthermore, the present invention is adapted for the mass production by the simple joining method.

33 Claims, 14 Drawing Sheets

PIPE WITH FLANGE FOR PIPE FITTING, PIPE FLANGE USED THEREWITH AND METHOD OF JOINING SAID PIPE WITH FLANGE WITH PIPE

FIELD OF THE INVENTION

The present invention relates to a pipe having a flange made integral therewith for pipe fitting, a pipe flange used with a pipe and a method for joining a pipe to a flange integrally.

DESCRIPTION OF THE PRIOR ART

When a pipe is joined to a pipe flange to form "a pipe with an integrated flange" for pipe fitting, various methods or types such as the screwed type, the butt welding type, the socket welding type and so on have been widely used. Especially when a pipe to be joined has a thin pipe wall, the socket brazing type joint and the like have been employed. When the weight reduction of the joint between pipes is important as in the case of automotive exhaust mulfers, the slip-on welding type joining method which uses a pipe flange produced by forming of sheet metal and a thin walled pipe, the slip-on welding type joining method and the like have been used.

In the case of the screwed type joint in which a flange is threaded on a pipe to be joined, a sealing means is required. In this case, however, a thick-walled pipe is required because screw threads must be formed or generated thereon, so that it is rather difficult to use thin walled pipes.

Furthermore, in the case of joining a pipe to a flange by the butt welding type joining method, burn through is likely to occur and distortions of materials due to heating become greater so that this type of joining method cannot be used to join between thin-walled pipes and pipe flanges produced by forming sheet metal. Moreover in the case of the socket welding type or socket brazing type joining method, the joining efficiency is not satisfactory. Furthermore, when the heat treatment succeeding to the welding or brazing process is not suitably carried out in the case of the socket welding or brazing type method, the desired strength of the joint, the satisfactory outer appearance of the joint and the required degree of corrosion resistance can not be obtained. Especially when the socket welding or brazing type method is used to join between a thin walled pipe and a pipe flange produced by forming sheet metal forming, the welding or brazing operation becomes more difficult and the desired degree of welding or brazing operation efficiency cannot be attained.

Furthermore, in the case of the socket welding or brazing type method, skilled welders are required. In addition, due to gases and fumes produced during a welding or brazing operation, a working environment is contaminated.

Recently, in the case of the fabrication of the structural components such as automotive exhaust pipes and mufflers which are partially subjected to high temperature exhaust gases, a pipe flange, which is produced by a sheet metal machine from a hot-dip aluminum-coated carbon steel sheet which exhibits a higher degree of corrosion resistance against high temperatures and a high degree of corrosion resistance, and an electric resistance welded carbon steel tube, which is used as a material for automotive structural components and is hot-dip aluminum-coated, are joined together by the welding process. However, such surface treated steel products as described above are more difficult to be joined by welding or brazing. In addition, when such products are subjected to welding or brazing process, their coating is peeled off or destroyed so that a portion of a product which is subjected to the exhaust gases at the highest temperature loses its corrosion resistance. Moreover, aluminum is dissolved into weld metal so that the joint becomes hard and brittle. As a result, when such product is subjected to repeated vibrations, it cracks.

In view of the above, the same inventor proposed in Japanese Patent Application Laying-open No. 105088/1989, a method for joining metal pipes each having an integral flange and a method for production thereof in order to eliminate the defects encountered when a pipe with a flange is joined with a pipe by the above-described joining methods. Furthermore, even though not a flange pipe joint, Japanese Patent Application Laying-open No. 76231/1985 discloses a method for joining pipes and sheet members in order to fabricate, for example, automotive exhaust pipes and mufflers.

The invention disclosed in the Japanese Patent Application Laying-open No. 76231/1985 proposes the method by which a pipe and a sheet metal component part is made into a unitary structural component by joining the pipe with the sheet metal component part through a cylindrical color both ends of which are made integral with pipe flanges. However, the method disclosed by this invention is mainly to prevent plastic deformations of the metal sheet component part. As a result, this method cannot be employed when a satisfactory joint strength is desired when the method is used to joint a pipe with a pipe flange fabricated by a sheet metal machine. Because of the reasons described above, pipes with an integrated flange are joined together with bolts and nuts, the joint between them is loosened so that the complete airtightness cannot be ensured.

Furthermore, according to the method as disclosed in the above-described Japanese Patent Application Laying-open No. 105088/1989, the leading end of a pipe must be previously bent outwardly so that special jigs and complicated sheet metal machines or the like must be used so as to fabricate the leading of the pipe in a manner described above. As a consequence, from the standpoint of workability, the above-described method must be further improved.

SUMMARY OF THE INVENTION

The first object of the present invention is therefore to provide pipes with integral flanges for pipe fitting which are light in weight, exhibit a satisfactory degree of air tightness when joined and are adapted for the mass production.

The second object of the present invention is to provide pipe flanges which have rational shapes and are used to fabricate pipes with integrated flanges.

The third object of the present invention is to provide a method for joining a pipe flange with a pipe in a highly efficient manner and without causing contamination of the working environment.

The present invention provides a pipe integral with a flange of the type in which the leading end portion of the pipe is securely joined with a pipe flange. The invention is characterized in that the diameter of the leading end portion of the pipe is gradually increased as the leading end portion approaches the end thereof.

The pipe flange is formed with a first contact portion which is made into close contact with the outer cylindrical surface of the leading end portion of the pipe. A second contact portion is connected to the first contact portion through a folding-back portion at the leading end portion of the first contact portion and is made into close contact with the inner cylindrical surface of the leading end portion of the pipe; the leading end portion of the pipe and the first and second contact portions (which define a hem or a pleat-like shape) are securely seamed into the integrated joint.

The pipe flange can be fabricated by drawing sheet metal. In order to ensure the strong joint between the pipe and the pipe flange, it is preferable that the surface is a frustoconical surface having a constant taper angle. The surface can also be a step-wise frustoconical surface consisting of a plurality of frustoconical surfaces which have different taper angles, respectively, and which are smoothly merged with each other. Also a convex-like curved surface whose radius of curvature is increased in the direction opposite to the contact surface is suitable. It is also preferable that the contact surface is formed with a step in parallel with the contact surface of the pipe flange.

The pipe flange used in the present invention is characterized by being formed with an opening into which is fitted the leading end portion of the pipe, an annular groove which is coaxial with the opening and surrounds the opening, a cylindrical portion formed between the annular groove and the opening, and a folding-back portion at which the cylindrical portion is folded back (radially inwardly) to define a pipe retaining portion which retains the leading end portion of the pipe.

A method for joining a pipe with a flange to obtain a pipe integral with a flange for pipe fitting in accordance with the present invention is characterized in that when the pipe is integrally joined with the pipe flange having an opening into which is fitted the leading end portion of the pipe, an annular groove which is coaxial with the opening and which surrounds the same, a cylindrical portion formed between the opening and the annular groove, a folding-back portion of the cylindrical portion at which the cylindrical portion is folded back (radially inwardly) over the leading end portion of the pipe and which retains the end of the leading end portion of the pipe, and a pipe retaining portion which is extended from the folding-back portion in parallel with the cylindrical portion and which is radially inwardly spaced apart from the cylindrical portion by a predetermined distance so that the leading end portion of the pipe can be fitted into an annular space defined between the cylindrical and pipe retaining portions, the method comprising a step of fitting the leading end portion of the pipe into the annular groove when the pipe is fitted into the opening, and a step for expanding the leading end portion of the pipe fitted into the annular groove, the cylindrical portion and the pipe retaining portion radially outwardly against the radially outward inner surface (which is referred as "the outward inner surface or the inner surface for brevity" in this specification), whereby they are securely and integrally joined together.

According to the present invention, it is preferable that the leading end portion of the pipe is fitted with transition fit or clearance fit into the annular space defined between the cylindrical and pipe retaining portions. In order to enhance the strength of the joint between the pipe and the pipe flange, it is preferable that the outward surface is a frustoconical surface with a constant taper angle. Also, the surface can be a stepwise frustoconical surface consisting of a plurality of frustoconical surfaces which have different taper angles which become more acute as the frustoconical surfaces approach the bottom of the annular space and which are smoothly merged with each other. Also a convex-like curved surface whose radius of curvature is increased as the curved surface approaches the bottom of the annular space is suitable. Furthermore, the outward surface of the annular space can be stepped to define a step or shoulder which is in parallel with the contact or joint surface of the pipe flange and is extended radially inwardly. In this case, the pipe retaining portion is forcibly pressed against the step in the seaming step. According to the present invention, the pipe flange can be fabricated by drawing sheet metal by a suitable sheet metal machine or by any suitable method which can improve productivity.

As described above, the leading end portion fitted into the annular space defined between the cylindrical and pipe retaining portions and the cylindrical and pipe retaining portions themselves are expanded radially outwardly by using a die and a punch, whereby the pipe and the pipe flange can be seamed integrally.

By the seaming step, the leading end portion of the pipe and the cylindrical and pipe retaining portions are all forced to press against the outward inner surface of the annular groove so that the pipe and the pipe flange can be securely joined together. Therefore the joint strength is sufficient enough that the pipes integral with a flange in accordance with the present invention can be used to flow a liquid under a relatively low pressure therethrough and as structural component parts when an excessively high pressure or force is not exerted to the pipe from the direction perpendicular to the axis of the pipe.

According to the present invention, the pipe flange itself is very simple in construction so that the mass production of the pipe flanges by the sheet metal machines, the cutting machines and any other suitable means becomes possible in a simple manner. In addition, the die and its associated punch which are designed and fabricated especially for the purpose of seaming the pipe and the pipe flange, are utilized so that no skilled workers such as those skilled in welding and brazing are required. Furthermore, the working environment will not be contaminated by gases and fumes produced in the welding and brazing processes. In addition, extremely high productivity can be ensured and the quality of the pipe integral with the pipe flange can be maintained at a satisfactory level. Moreover, the present invention can be applied when the metals which are difficult to weld or braze are used and when the pipes and the pipe flanges are fabricated from different materials so that high technical advantages can be obtained. Since the sealing, screw threading and welding processes can be eliminated, the thin-wall pipes can be used. Especially when the pipe flange is fabricated from sheet metal or strip, the pipe integral with the pipe flange becomes extremely light in weight so that it can be advantageously used in the production of the automotive vehicles. Furthermore, when the pipe and the pipe flange are fabricated from copper sheets or the like coated with molten aluminum, the pipe integral with the pipe flange in accordance with the present invention exhibits a high degree of corrosion resistance in the high temperature gas atmosphere.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will become more apparent from the following description of five embodiments thereof taken in conjunction with the accompanying drawings.

Figure 1:
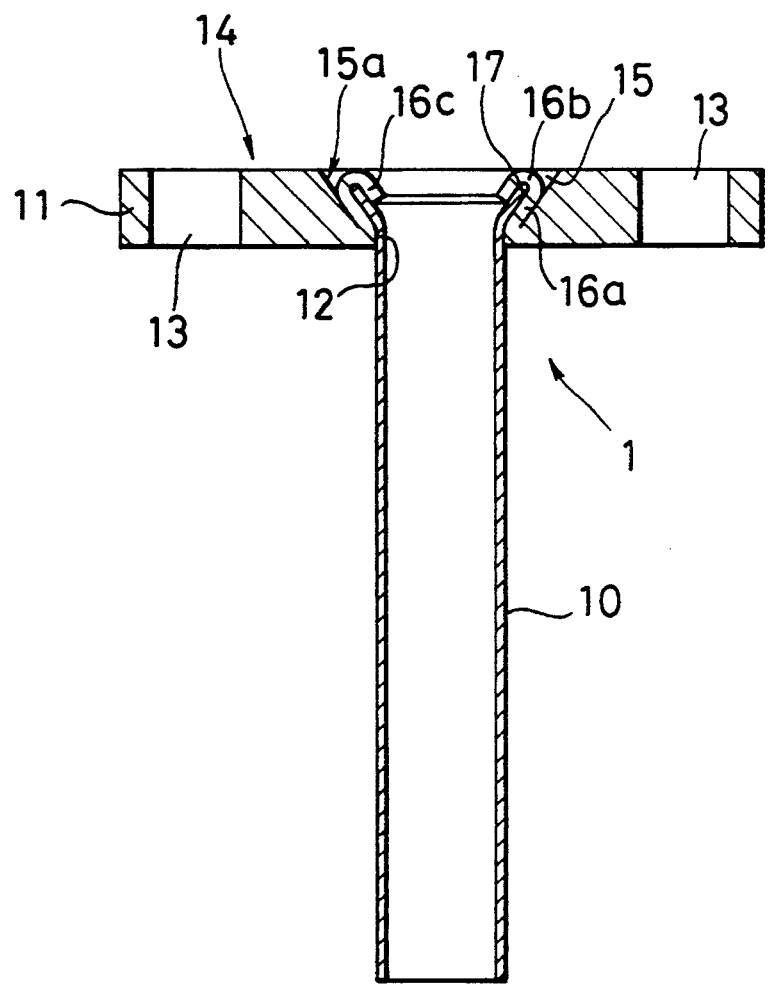
FIG. 1 is a sectional view of a first embodiment of the present invention.
Figure 2:
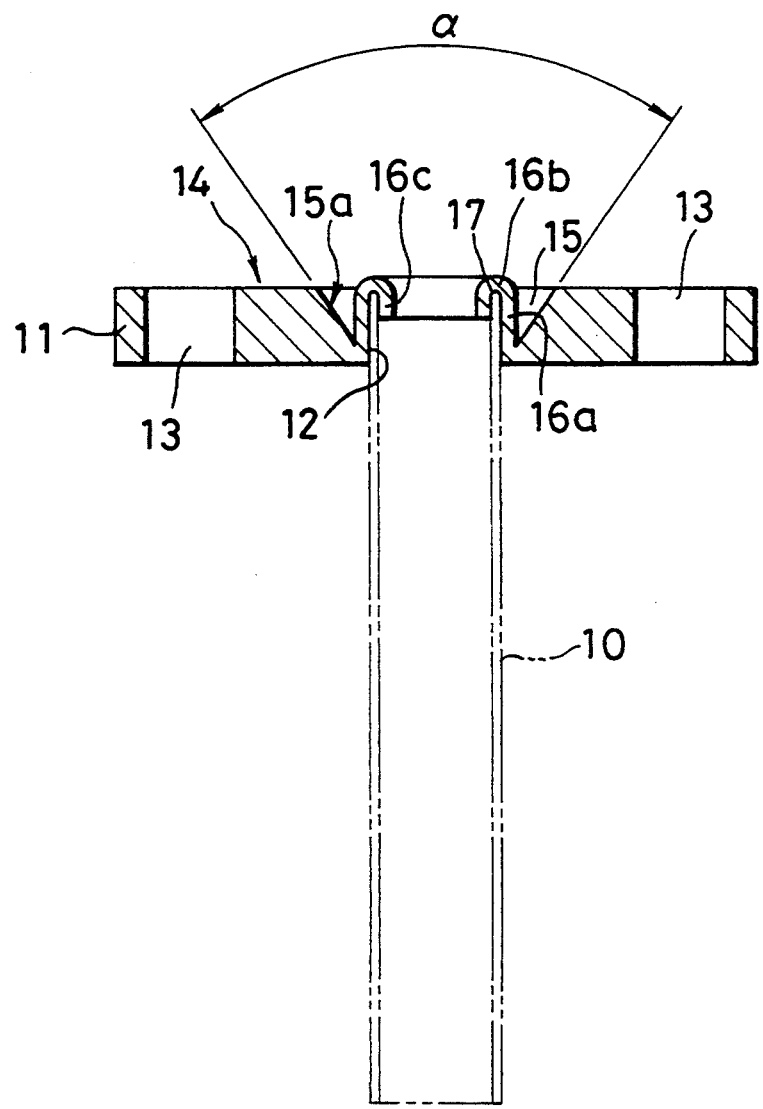
FIG. 2 is a longitudinal sectional view of a pipe flange used to fabricate the pipe with a flange shown in FIG. 1.
Figure 3:
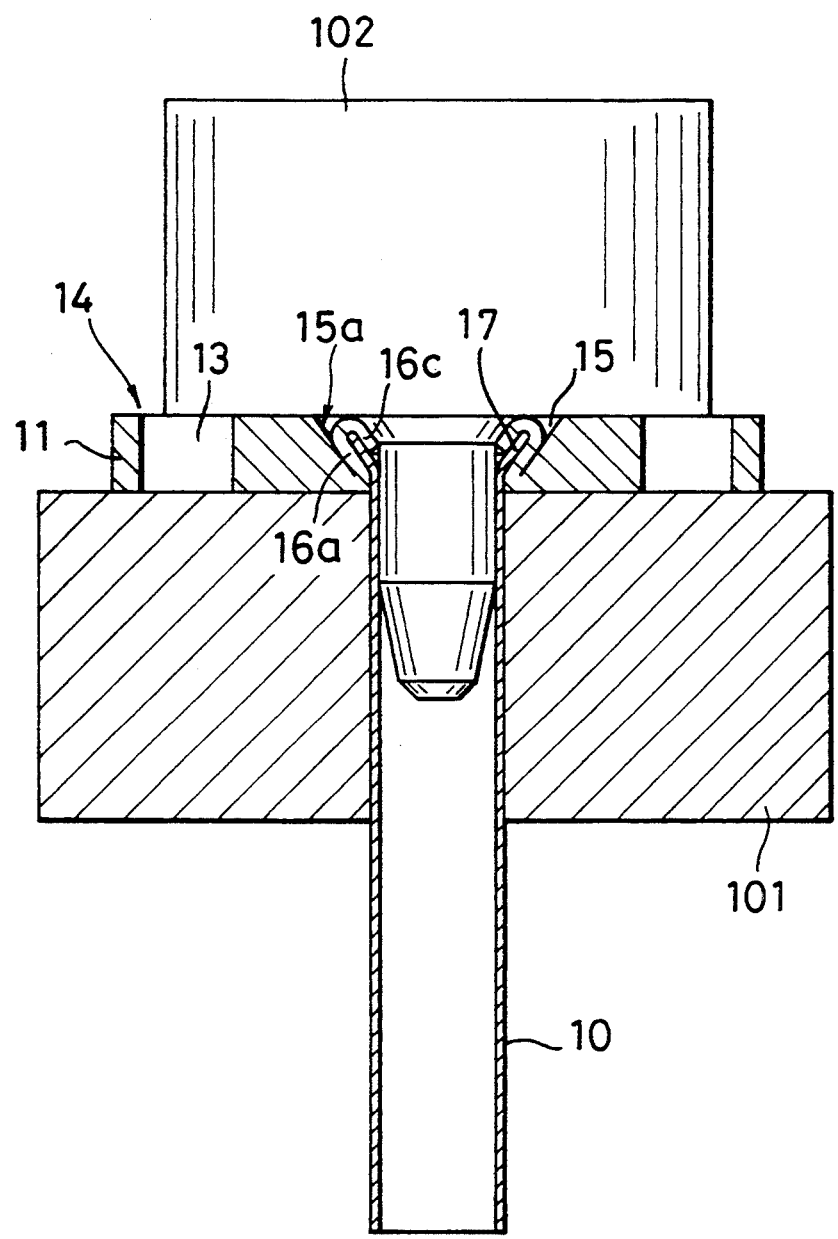
FIG. 3 is a longitudinal view illustrating the step of joining the pipe flange with the pipe in accordance with the first embodiment.

First Embodiment, FIGS. 1, 2 and 3

A pipe 10 used in the first embodiment is a pipe for electric welding according to SUS 304TP of stainless steel tubes for piping as defined in JIS G 3459. The dimensions of this pipe 10 are in the Appendix 2 "Dimensions and Mass" in JIS G 3459; that is, the pipe 10 has a Nominal Diameter of 10, the outer diameter of 17.3 ±0.05 mm according to Schedule 5S and the thickness of 1.2 ±0.2 mm.

The material of a pipe flange 11 in accordance with the first embodiment is a hot rolled stainless steel plate sheet and strip in cut length; that is, the thickness is 9 mm; the width, 1219 mm and the length, 2438 mm according to SUS 304HP as defined in JIS B 2210. The pipe flange 11 has a shape similar to the shape with the Nominal Diameter 10 as indicated in Appendix 2 of steel tube flange with "Nominal Pressure 5K Flange Basic Size" which in turn is defined in JIS B 2210. More specifically, as best shown in FIG. 2, the pipe flange 11 has a chamfered rhomboid shape whose major diameter is 75 mm and whose minor diameter is 45 mm. Such rhombus-shaped pipe flange 11 has an opening 12 at the center into which is fitted the pipe 10 having the Nominal Diameter 10. Furthermore the pipe flange 11 has two bolt holes 13 of 12 mm in diameter whose centers are spaced apart from each other by 55 mm in opposing relationship with each other in the direction of the major axis. An annular groove or depression 15 which is coaxial with the opening 12 and is opened toward the contact surface 14 of the pipe flange 11, has a frustoconical surface 15a whose taper angle $\alpha$ is 50 degrees. A cylindrical portion 16a which is defined between the opening 12 and the annular groove 15 is 2 mm in thickness and $$17.3 \,{}^{+0.05}_{\phantom{+}0} \text{ mm}$$

in inner diameter. The folded-back portion 16b which is folded back at the folding portion 16b of the cylindrical portion 16a and which retains the leading end of the pipe 10 has a pipe retaining portion 16c which is in parallel with the cylindrical i.e. conical portion 16a and is defined on the inner side of the cylindrical portion 16a. The pipe retaining portion 16c is $$14.9 \,{}^{+0.45}_{-0.45} \text{ mm}$$

in outer diameter. It follows therefore that the annular groove 17 defined between the cylindrical portion 16a and the pipe retaining portion 16c and the pipe 10 inserted into the annular groove 17 have a clearance fit relationship.

In the case of the fabrication of the pipe integral with flange 1 of the first embodiment of the present invention, the leading end portion of the pipe 10 is inserted through the pipe fitting opening 12 of the pipe flange 11 into the annular groove 17 defined between the cylindrical portion 16a and the pipe retaining portion 16c until the leading end of the pipe 10 is forced into contact with the bend-back portion 16b. Next as best shown in FIG. 3, by using a die 101 which hold both the pipe 10 and the pipe flange 11 and a punch 102 whose leading end portion is inserted into the upper end portion of the pipe 10, the cylindrical portion 16a, the folded-back portion 16b, the pipe retaining portion 16c and the upper end portion of the pipe 10 are forced to be expanded radially outwardly of the opening 12 so that the flared cylindrical portion 16a, the folded-back portion 16b, the pipe retaining portion 16c and the upper leading end portion of the pipe 10 are hemmed to deform themselves substantially in parallel with the frustoconical surface 15a of the annular groove 15, whereby a flared opening is defined. More particularly, the punch 102 expands the diameters of the upper leading end portion of the pipe 10, the flared cylindrical portion 16a and the pipe retaining portion 16c so that the upper leading end portion of the pipe 10 is seamed integral with the pipe flange 11 through the flared cylindrical portion 16a and the pipe retaining portion 16c. Thus the pipe with the integral flange generally indicated by the reference numeral 1 can be fabricated.

As described above, when the upper leading end portion of the pipe 10, the cylindrical portion 16a and the pipe retaining portion 16c are forced to flare to diverge toward the joint contact surface 14 of the pipe flange 11 by utilizing the frustoconical surface 15a of the annular groove 15, the die 101 and the punch 102 which cooperate to expand the upper leading end portion of the pipe 10, the cylindrical portion 16a and the pipe retaining portion 16c radially outwardly, can be made very simple in construction.

It is to be noted here that even when the pipe 10 and the pipe flange 11 are made of materials having a high degree of yielding strength, when a suitable taper angle $\alpha$ is selected depending upon the thickness of the pipe flange 11, the pipe 10 and the pipe flange 11 can be joined together with a desired joint strength unless the wall thickness of the pipe 10, the cylindrical portion 16a and the pipe retaining portion 16c are made too thin.

According to the first embodiment, the upper leading end portion of the pipe 10 is inserted into the annular groove 17 defined between the cylindrical portion 16a and the pipe retaining portion 16c which are coaxial with the center of the pipe flange 11 and then the die 101 and the punch 102 are used to forcibly expand radially outwardly the upper leading portion of the pipe 10, the cylindrical portion 16a and the pipe retaining portion 16c so as to press them securely against the frustoconical surface 15a, whereby the pipe 10 and the pipe flange 11 are integrally seamed together. As a result, the pipe 10 and the pipe flange 11 can be firmly joined together in a simple manner and furthermore it is not necessary to machine or form previously the upper leading end portion of the pipe 10. Thus, workability or productivity can be much enhanced.

The strength of the joint between the pipes and the pipe flanges fabricated by the method described above was measured. In this case, used as the pipe 10 was STAM 290GA electric resistance welded steel pipe for automotive component parts component parts which has a high degree of yielding strength and exhibits a relatively high degree of elongation percentage and a relatively high degree of weldability as defined in JIS G 3131. Its dimension is 50.8 mm in outer diameter and 1.6 mm in thickness. The pipe flange 11 was made from SPHD (for drawing) in hot-rolled low carbon strip of 9 mm in thickness and 600 mm in width. The flange was in the form of a rhombus with the major axis of 118 mm and the minor axis of 80 mm. The flange 11 had two punched bolt holes 13 which were 10 mm in diameter and were spaced apart from each other (from center to center) by 92 mm. The width of the annular groove or space 17 defined between the cylindrical portion 16a and the pipe retaining portion 16c was 1.6 mm so that the clearance fit of the pipe 10 into the annular space 17 became possible.

The leading end portion of the pipe 10 was inserted into the annular space 17 of the pipe flange 11 and by using the die 101 and the punch 102, the leading end portion of the pipe 10, the cylindrical portion 16a and the pipe retaining portion 16c were flared and pressed against the frustoconical surface 15a, whereby they were integrally seamed and the pipe with the integral flange was obtained.

Thus fabricated pipe 1 with the integrated flange was securely mounted with two bolts on the mounting stand of a testing device (not shown) in such a way that the joint contact surface 14 became perpendicular to the mounting stand. Thereafter, the pressure application means (not shown) was placed at a position spaced apart from the mounting stand by 300 mm along the axis of the pipe 10 so as to apply the static load to the pipe 10 in the direction of the line interconnecting between the centers of the bolt holes 13 so that the bending moment is applied to the joint between the pipe 10 and the pipe flange 11. In this manner, the displacement or distortion of the flange due to the applied static load was continuously measured until the pipe 1 with the integrated flange was destroyed. The test result was shown in FIG. 4.

Figure 4:
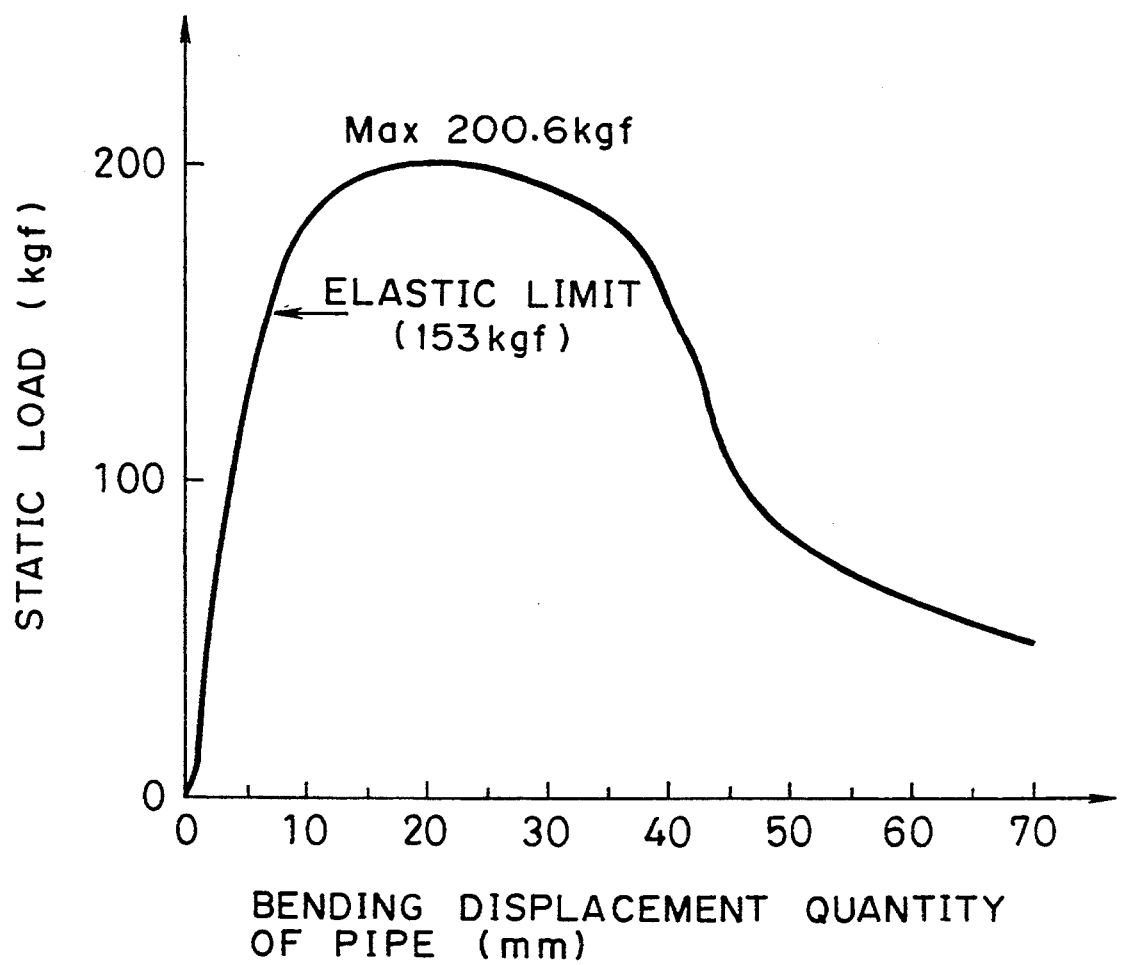
FIG. 4 is a graph illustrating the joint strength of the pipe integral with the flange according to the first embodiment.

Referring now to FIG. 4, the displacement of the pipe 10 at the point at which is applied the static load is plotted along the abscissa while the static load is plotted along the ordinate. From this graph, it is seen that immediately before the static load becomes in excess of the elastic limit 148 kgf ~160 kgf, which are the elastic limits of the materials of the pipe 10 and the pipe flange 11, so that the displacement becomes 20 mm~25 mm and when the static load becomes the maximum static load (which is sometimes referred to as "drawing resistance" in this specification) of 194.2 kgf~221.6 kgf, which are 1.311~1.385 times as high as the elastic limit, the integral assembly of the pipe 10 and the pipe flange 11 remains unchanged or intact. However, when the static load applied approaches the maximum static load, the pipe 10 and the pipe flange 11 relatively slide to each other and thereafter it was noted that even when the displacement increases, the static load gradually decreases. Furthermore, when the static load becomes 125 kgf~149 kgf and the displacement approaches 43 mm~50 mm so that the leading end of the pipe 10 is pulled out of the annular space 17 defined between the pleat-like cylindrical and pipe retaining portions 16a and 16c, the ratio between the static load and the displacement changes and the displacement suddenly increases.

In other words, the maximum static load is defined as the load under which the leading end portion of the pipe 10 starts to slide with respect to the flared cylindrical and pipe retaining portions 16a and 16c of the pipe flange 11 at the seamed joint of the pipe with the integral flange 1 and which is not directly dependent upon the strength of the pipe 10. Therefore, according to the first embodiment of the present invention, the seamed joint will not become loose when the bending moment exerted to the seamed joint of the pipe with the integral flange 1 is less than about 190 kgf×300 mm so that the pipe with the integral flange 1 can be used to flow a liquid under a low pressure. Moreover, even when leakage occurs, the quantity of leaking liquid gradually increases as the leading end portion of the pipe 10 slides with respect to the pipe flange 11 and the direction in which the liquid leaks in the form of a jet is limited to the direction in parallel with the outer cylindrical surface of the pipe 10 so that the safety of the operation can be ensured.

So far in the first embodiment, it has been described that the tapered angle of the frustoconical surface 15a of the annular groove 15 is defined as $\alpha$, but it is to be noted that the taper angle of the frustoconical surface 15a can be gradually reduced toward the bottom of the annular groove 15. In this case, the sharply curved or tapered portion adjacent to the bottom of the annular groove 15 serves mainly to join the pipe 10 with the pipe flange 11 air-tightly. The portion of the frustoconical surface 15a which has a large tapered angle mainly serves to prevent the leading end portion of the pipe 10 from being pulled out of the pipe flange 11 due to vibrations and bending moments exerted in the direction perpendicular to the axis of the pipe 10. It follows therefore that as compared with the frustoconical surface 15a with a constant taper angle $\alpha$, the drawing resistance can be increased so that such stepped conical surface is very advantageous when the elongation percentage of the materials of the pipe and the pipe flange are higher and when the diameter of the pipe 10 is larger.

Figure 5:
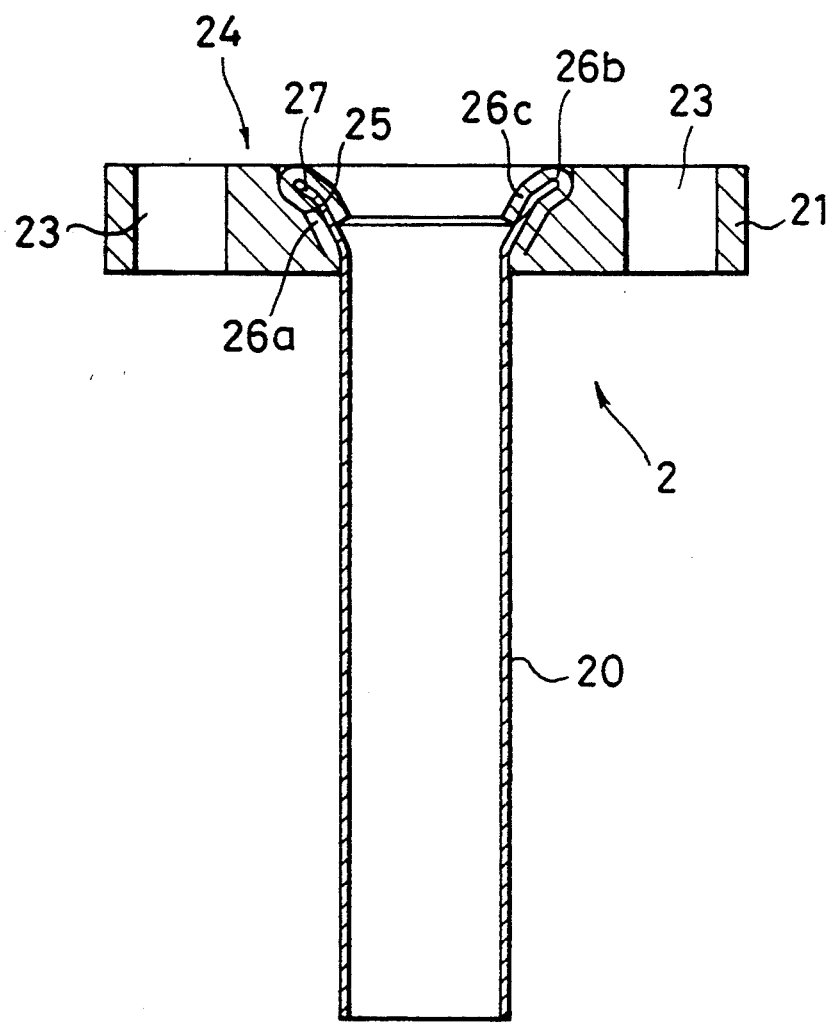
FIG. 5 is a longitudinal sectional view of a pipe with an integral flange in accordance with the second embodiment of the present invention.
Figure 6:
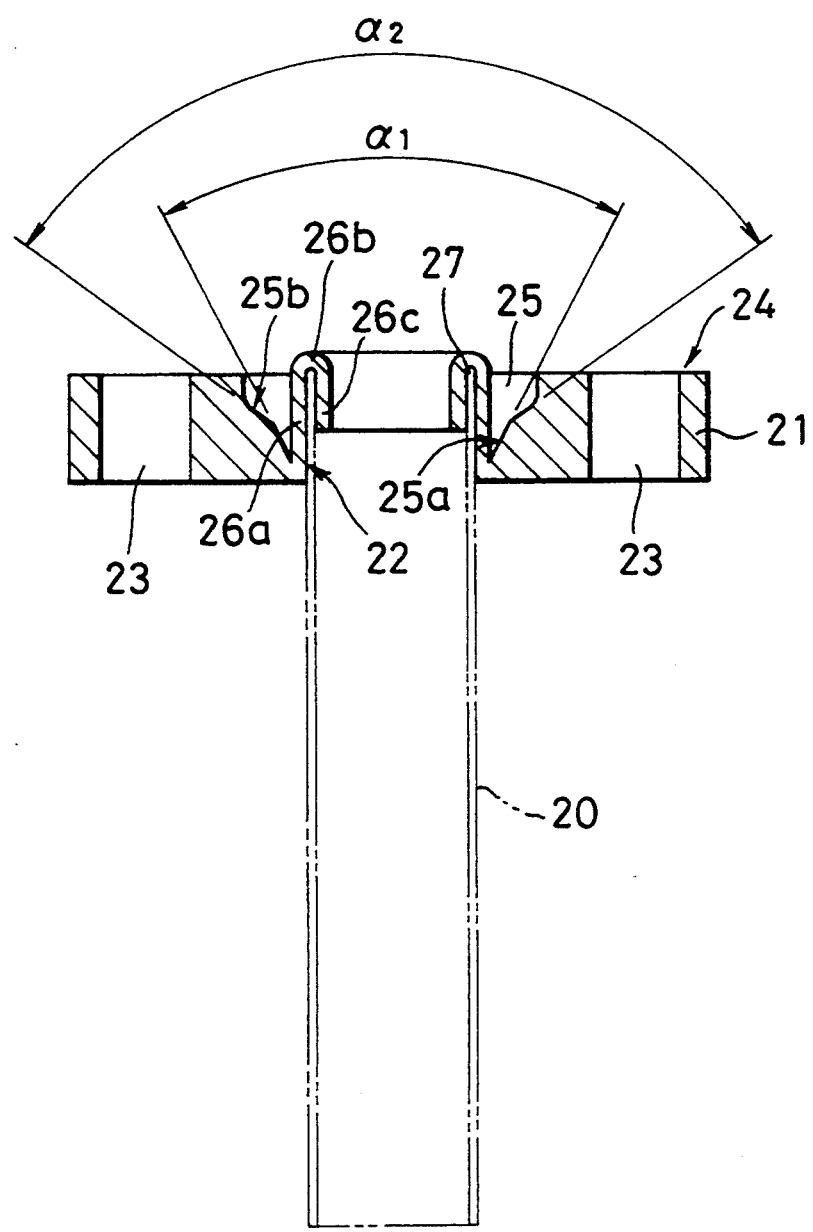
FIG. 6 is a longitudinal sectional view of a pipe flange used to fabricate the pipe with a flange shown in FIG. 5.

Second Embodiment, FIGS. 5 and 6

Referring next to FIGS. 5 and 6, the second embodiment of the present invention having the above-described feature will be described in detail hereinafter.

According to the second embodiment, the inner surface of the annular groove 25 consists of a plurality (two in the second embodiment) of frustoconical surfaces 25a and 25b having different taper angles $\alpha_1$ and $\alpha_2$, respectively. And the taper angle $\alpha_1$ of the frustoconical surface 25a adjacent to the bottom of the annular groove 25 is smaller than the taper angle $\alpha_2$ of the frustoconical surface 25b the lower side of which merges with the upper side of the lower frustoconical surface 25a.

In the second embodiment, a pipe 20 is C 1220 of copper and copper alloy welded pipes or tubes defined in JIS H 3320 and is 22 mm in outer diameter and one millimeter in thickness. The material of a pipe flange 21 is a brass strip or the like which corresponds to the Alloy No. C 2801 and Mark C 2801R defined in the Table 1 "Types and Codes" in JIS H 3100 and which is 10 mm in thickness, 365 mm in width and 1200 mm in length. The shape corresponds to that with a Nominal Diameter 20 (corresponding to the outer diameter 22.22 mm of the pipe 20) defined in the Appendix Table 1 "Standard Size of Flange for Nominal Pressure 5K" of JIS B 2240. More particularly, the pipe flange 21 is in the form of a punched ring 85 mm diameter and has four bolt holes 23 which are 12 mm in diameter and are equiangularly spaced apart from each other along a circle which has a radius of 65 mm and is coaxial with the ring-shaped pipe flange 21. The pipe flange 21 has an opening 22 into which the pipe 20 with the Nominal Diameter 20 can be inserted. The outward inner surface of an annular groove 25 which is coaxial with the opening 22 and is opened at the joint surface 24 consists of the lower frustoconical surface 25a with the tapered angle of $\alpha_1$ and the upper frustoconical surface 25b with the tapered angle of $\alpha_2$ ($\alpha_1 < \alpha_2$) as described above. More specifically, in the second embodiment, the angle $\alpha_1$ is 58 degrees while $\alpha_2$, 104 degrees. A cylindrical portion 26a which is interposed between the opening 22 and the annular groove 25 is 1.6 mm in thickness and 22 mm in inner diameter. One end portion of the cylindrical portion 26a is folded back to define a pipe retaining portion 26c which is extended in parallel with the cylindrical portion 26a and is spaced apart therefrom radially inwardly as best shown in FIG. 6. The pipe retaining portion 26c thus defined is 21 mm in outer diameter. The upper end portion of the pipe 20 is clearance fitted into an annular space 27 defined between the cylindrical portion and the pipe retaining portion 26c.

After the leading end portion of the pipe 20 is fitted into the annular space 27 of the pipe flange 27, a die and a punch (not shown) are used as in the case of the first embodiment so that the cylindrical portion 26a, folded-back portion 26b, the pipe retaining portion 26c and the upper leading portion of the pipe 20 inserted into the annular space 27 are all radially outwardly pressed against the outward inner surface of the annular groove 25. Therefore they are coaxially deformed by the lower and upper frustoconical surfaces 25a and 25b of the annular groove 25 to define a flared opening as best shown in FIG. 5. Thus, the pipe 20 and the pipe flange 21 are securely integrated or are made into a unitary construction, forming the pipe with the integral flange generally indicated by the reference numeral 2.

The test machine described in the first embodiment was also used in the second embodiment to exert the bending moment to the joint between the pipe 20 and the pipe flange 21 in order to continuously observe or measure the displacement or distortion of the pipe 20 under the static load until the pipe with the integral flange 2 was destroyed. The results of such tests are substantially similar to those shown in FIG. 4. The maximum load is 1.523~1.635 times as high as the elastic limit. This fact shows that the second embodiment is stronger than the first embodiment. It was also observed that no leakage occurs from the seamed joint between the pipe 20 and the pipe flange 21 when the nitrogen gas was forced to flow through the joint under the pressure of 12 kgf/cm$^2$. Thus, it is confirmed that the second embodiment has a satisfactory degree of joint strength and a high degree of air-tightness when used in practice. For example, the above-described features can guarantee that the second embodiment can be satisfactorily used as the joints of the automotive exhaust pipes.

As described above, according to the second embodiment of the present invention, the frustoconical surfaces 25a and 25b which merge to define the outward inner surface of the groove have different tapered angles $\alpha_1$ and $\alpha_2$ which become more acute angles as the frustoconical surfaces approach the bottom of the annular groove 25 so that the force required to draw the upper end portion of the pipe 20 from the annular space 27 of the pipe flange 21 becomes remarkably greater as compared with, for example, the first embodiment. Furthermore, the stronger joint strength can be attained by a smaller degree of seaming force. In addition, the second embodiment is adapted to be used advantageously when the above-described pipe 20 and the pipe flange 21 have a higher degree of elongation and especially when the pipe 20 has a large diameter and a thin-wall thickness.

Figure 7:
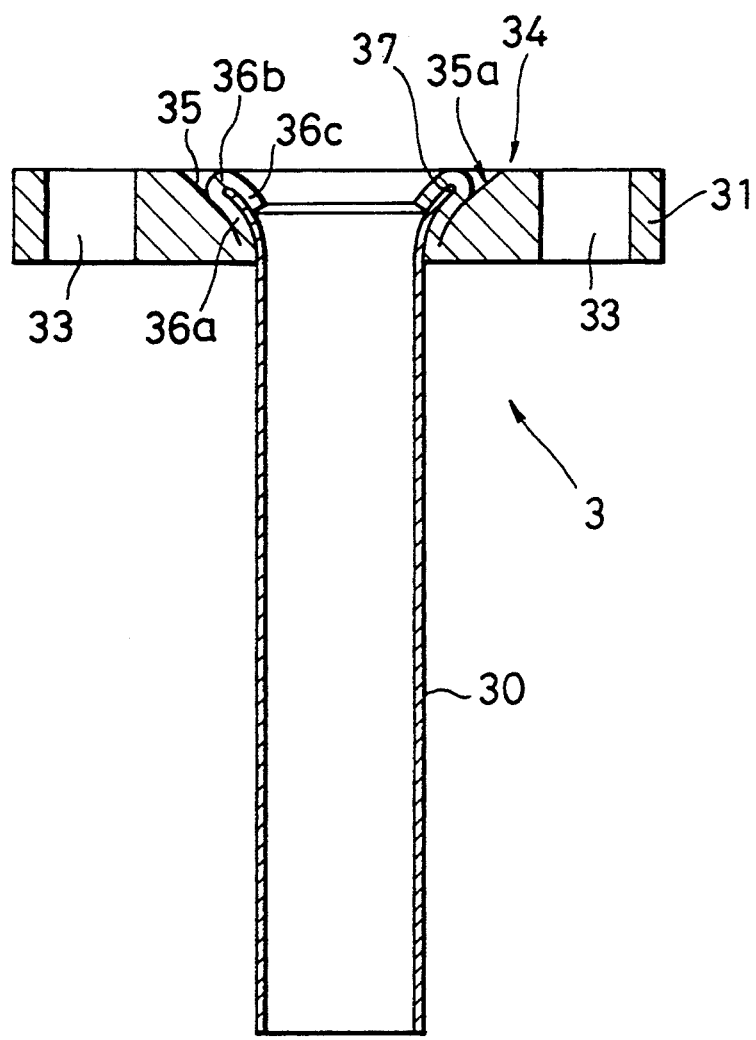
FIG. 7 is a longitudinal sectional view of a third embodiment of a pipe with an integrated flange in accordance with the present invention.
Figure 8:
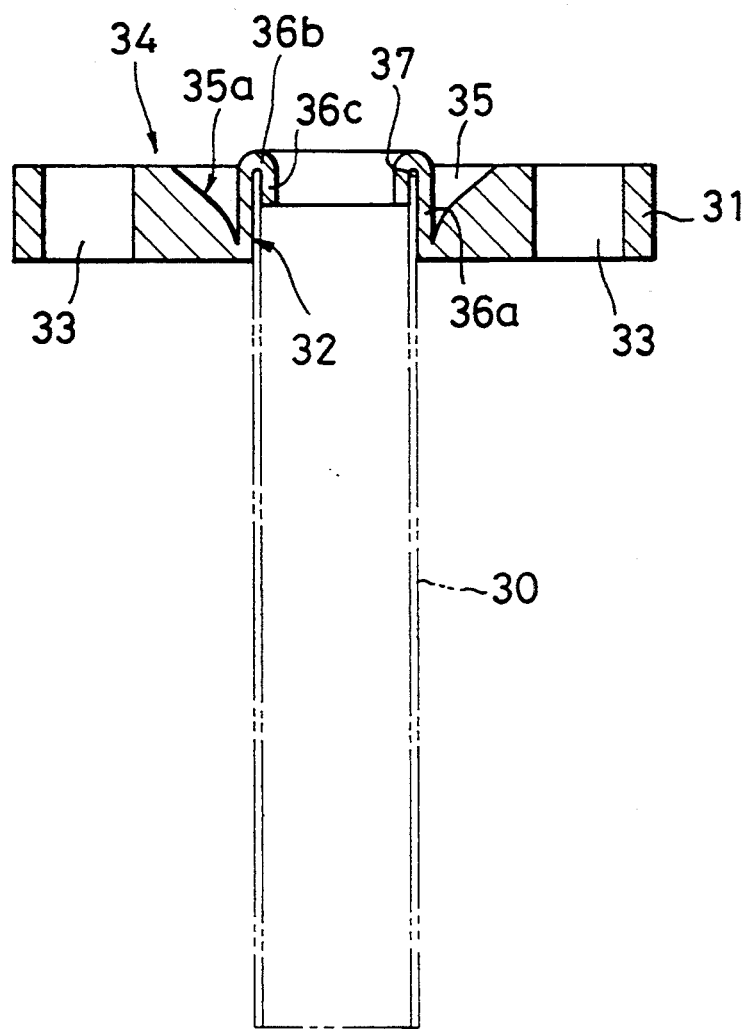
FIG. 8 is a longitudinal sectional view of a pipe flange used to fabricate the pipe with an integrated flange shown in FIG. 7.

In the second embodiment, it has been described that the inner surface of the annular groove 25 consists of a plurality of frustoconical surfaces whose tapered angles gradually become smaller as they approach to the bottom of the groove 25, but according to the present invention, it is possible to define a smoothly convex surface in such a way that it consists of a plurality of curved surfaces whose radii of curvature are gradually increased as the curved surfaces approach the bottom of the annular groove as will be described in detail hereinafter with reference to FIGS. 7 and 8.

Third Embodiment, FIGS. 7 and 8

In the third embodiment, the outward inner surface of an annular groove 35 has a smoothly curved convex surface whose cross section is gradually increased as the outward inner surface approach the bottom of the annular groove 35. The material and the dimensions of a pipe 30 are substantially similar to those of the second embodiment described above. Furthermore, a pipe flange 31 is also substantially similar to the flange 21 of the second embodiment except the annular groove 35 of the pipe flange 31. In FIGS. 7 and 8, reference numeral 32 denotes a pipe fitting groove; 33, bolt holes; 34, a contact or joint surface; 36a, a cylindrical portion; 36b, a folded-back portion; 36c, a pipe retaining portion; and 37, an annular space.

Moreover, the method for fabrication of the third embodiment is substantially similar to that described above in the first or second embodiment. The pipe integral with a flange thus fabricated is generally indicated by the reference numeral 3. The test machine used in the first and the second embodiments was also used to continuously measure the relationship between the static load applied to the pipe integral with the flange 3 and the resulted displacement thereof. The result of the test shows that the maximum static load is 1.586~1.705 times as high as the elastic limit and is similar to that of the second embodiment. Furthermore, according to the third embodiment, the flared cylindrical portion 36a and the pipe retaining portion 36c of the pipe flange 31 which clamp the upper end portion of the pipe 31 therebetween are securely pressed against the curved surface 35a and are deformed like the surface 35a so that the outer appearance of the joint between the pipe 30 and the pipe flanges 31 is further improved.

Figure 9:
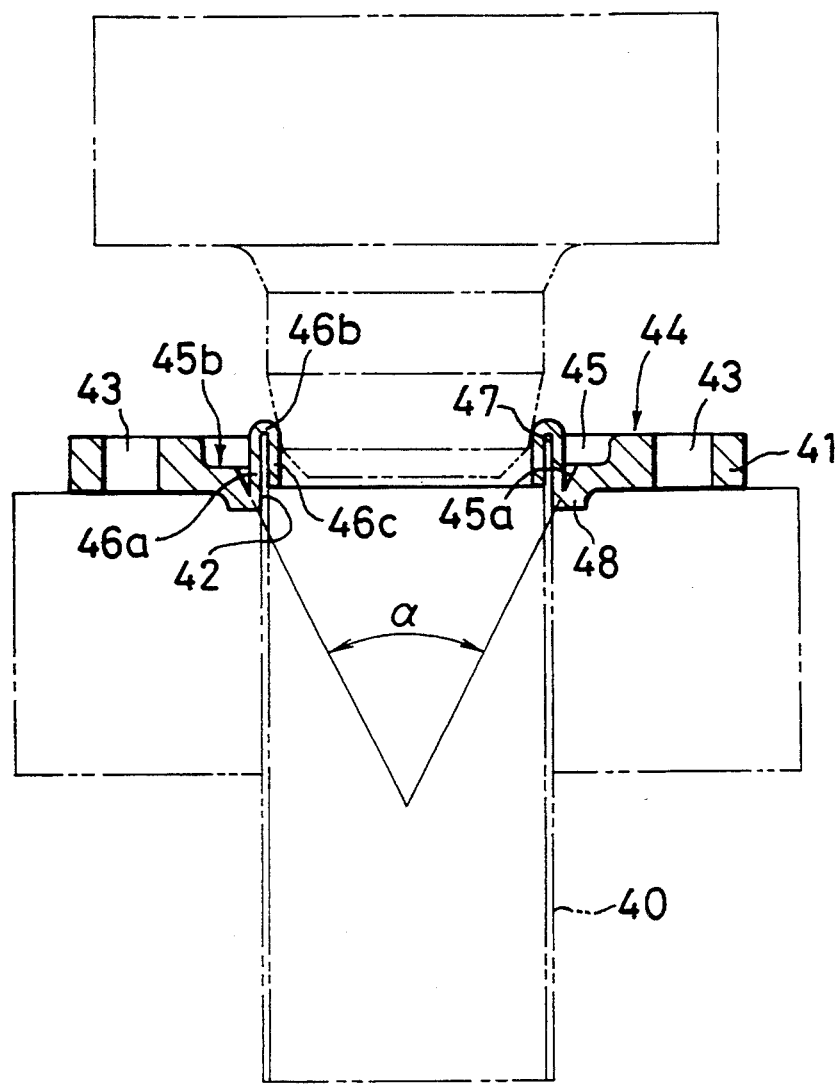
FIG. 9 is a longitudinal sectional view of a pipe flange used to fabricate a pipe with an integrated flange in accordance with a fourth embodiment of the present invention.
Figure 10:
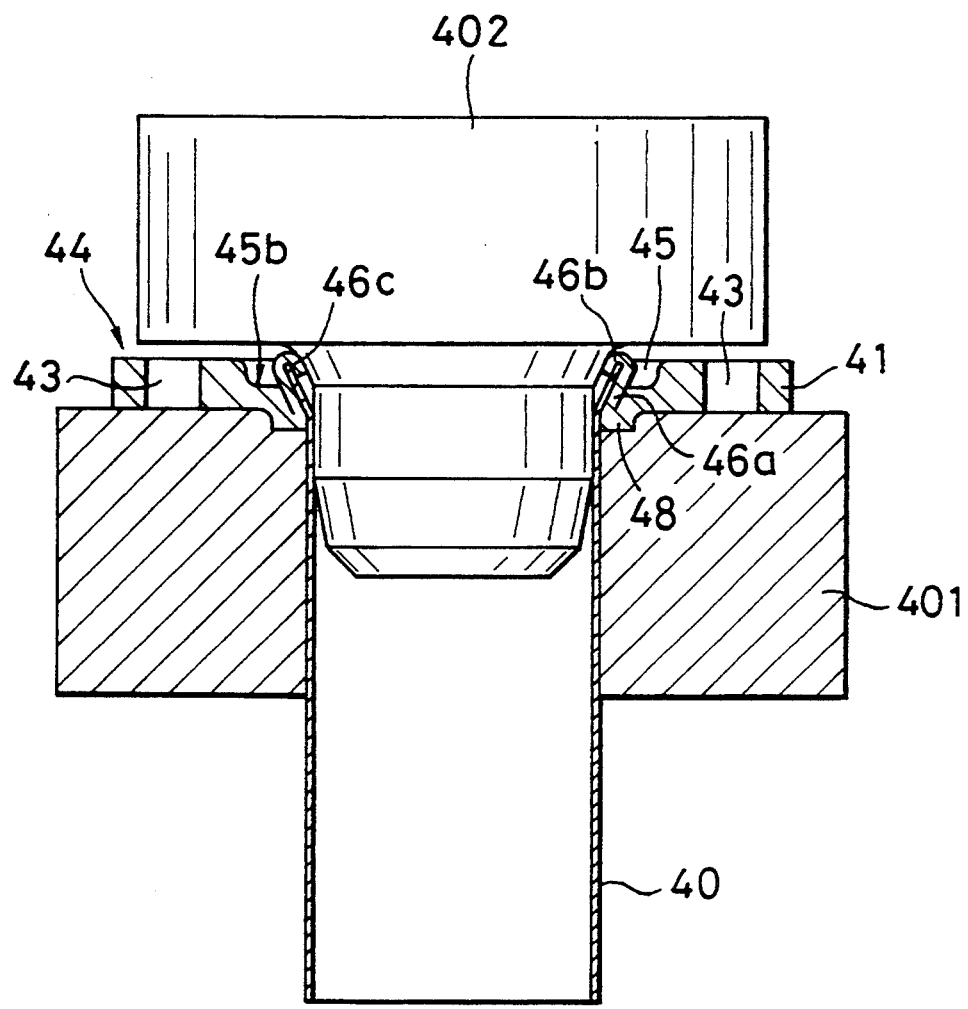
FIG. 10 is a longitudinal sectional view illustrating the step of joining a pipe to the pipe flange of the fourth embodiment shown in FIG. 9.
Figure 11:
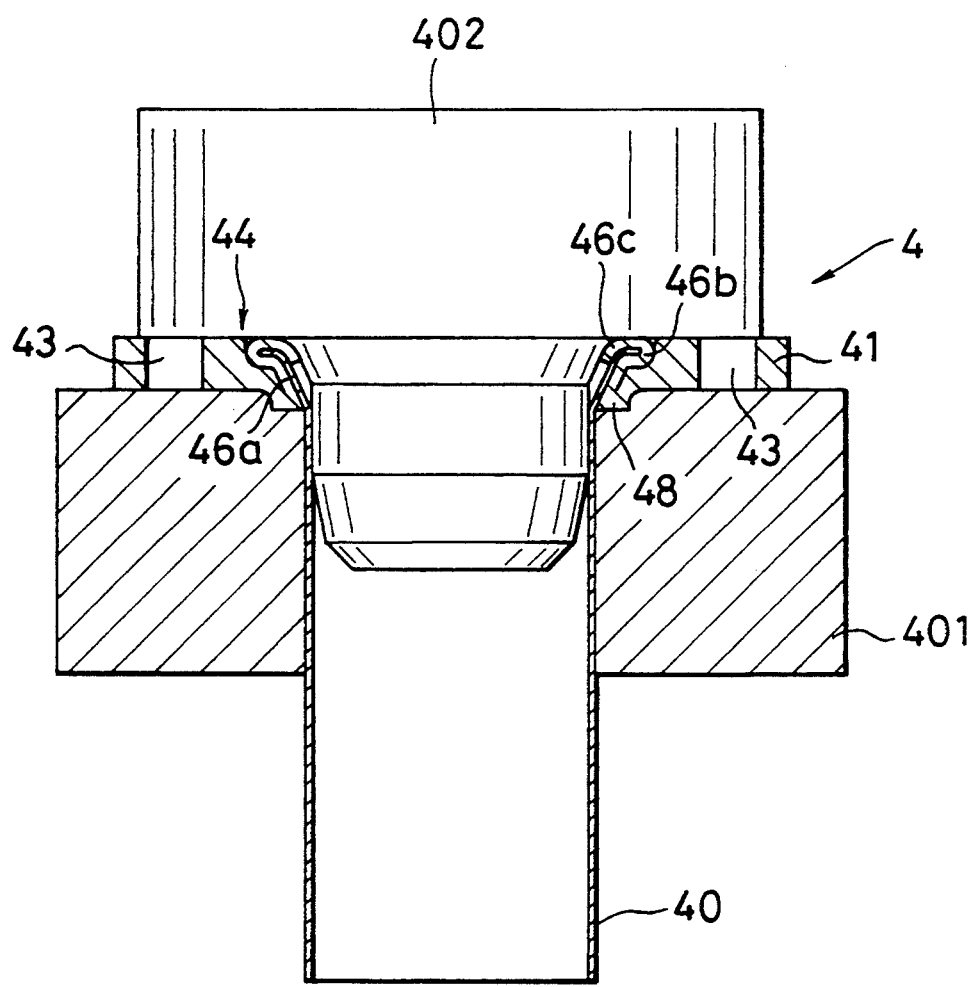
FIG. 11 is a longitudinal sectional view illustrating the last step for the fabrication of the pipe with the integrated flange in accordance with the fourth embodiment of the present invention.

Fourth Embodiment, FIGS. 9~11

When one or more steps are defined at the frustoconical surface 15a of the first embodiment, the merged frustoconical surfaces consisting of the lower and upper frustoconical surfaces 25a and 25b having different taper angles, respectively or the curved surface 35a of the above-mentioned first, second or third embodiment in such a way the horizontal portion of the step is in parallel with the contact or joint surface 14, 24 or 34, the strength of the joint between the pipe flange 11, 21 or 31 and the pipe 10, 20 or 30 can be further increased as will be described in detail below with reference to FIGS. 9~11.

In the fourth embodiment, a pipe 40 is an electric resistance welded pipe or tube STAM 290GH as defined in JIS G 3472 as a material for fabrication of automotive structural parts. The pipe 40 is 50.8 mm in outer diameter and 1.6 mm in thickness. The material of a pipe flange 41 is a hot-rolled low carbon steel sheet or strip as defined in JIS G 3131. The flange 41 is in the form of chambered rhombus with the major axis of 118 mm and the minor axis of 80 mm and is 9 mm in thickness. The blank of the pipe flange 41 is punched to define two bolt holes 43 which are 11 mm in diameter and are spaced apart from each other by 92 mm from center to center in the direction of the major axis. The pipe flange 41 is further subjected to the burring process to form a hub 48 of 63 mm in diameter and 13.5 mm in thickness at the center portion of the pipe flange 41. An opening 42 is extended through the hub 48 coaxially thereof. An annular groove 45 which is coaxial with the opening 42 and is opened at the contact or joint surface 44 has the outward inner surface consisting of a stepped surface with a step 45b and an inverted frustoconical surface 45a which is extended downwardly from the radially inward periphery of the step 45b at a taper angle $\alpha = 50$ degrees. A cylindrical portion 46a which is formed between the annular groove 45 and the opening 42 and is 2 mm in thickness is folded back at a folding portion 46b so as to define a pipe retaining portion 46c which is in parallel with the cylindrical portion 46a and is extended downwardly by a predetermined length and is spaced apart from the cylindrical portion 46a radially inwardly by 1.6 mm. The upper end portion of the pipe 40 is inserted with clearance fit into an annular space 47 defined between the cylindrical and pipe retaining portions 46a and 46c.

After the upper end portion of the pipe 40 is inserted into the annular space 47, by means of a die 401 adapted to securely hold the pipe 40 and the pipe flange 41 and a punch 402 whose lower end portion is inserted into the pipe 40, the cylindrical portion 46a, the folding portion 46b, the pipe retaining portion 46c and the upper end portion inserted into the annular space 47 of the pipe 40 are forced to flare radially outwardly and pressed toward the outward inner surface 45a and 45b of the annular groove 45 substantially in parallel therewith as best shown in FIG. 10. Thereafter, the punch 102 is further pushed downwardly in the direction of the axis of the pipe 40 so that, as best shown in FIG. 11, the upper end portion inserted into the annular space 47, the flared cylindrical portion 46a, the folding-back portion 46b and the pipe retaining portion 46c are forced to expand radially outwardly and press against the horizontal step portion 45b of the annular groove 45. Thus, the upper end port ion of the pipe 40, the flared cylindrical and pipe retaining portions 46a and 46c are securely seamed together into a unitary construction generally indicated by the reference number 4.

By using the test machine described above, the relationship between the static load applied to the pipe with the integrated flange 4 and the displacement thereof was continuously measured. The results of the tests show that even when the static load applied to the pipe integral with the flange 4 becomes in excess of the elastic limits of the pipe 40 and the pipe flange 41, the displacement gradually increases and the sudden displacement resulting from the static load in excess of the yielding point of the pipe integral with the flange 4 was not observed. Furthermore it was found out that when the displacement of the pipe 40 becomes 64 mm~70 mm, the maximum static load becomes 235.58 kgf~264.8 kgf. Such maximum static load is 1.581 ~1.655 times as high as the elastic limits of the pipe 40 and the pipe flange 41. When the applied static load becomes maximum as described above, the ratio between the static load which decreases and the displacement which increases become relatively higher and the upper end portion of the pipe 40 is pulled out of the pipe flange. As described above, no yielding occurs and the maximum static load is higher so that it was confirmed that the fourth embodiment satisfactorily serves to flow a liquid and that it has a sufficient degree of strength to be used as a structural component part.

Figure 12:
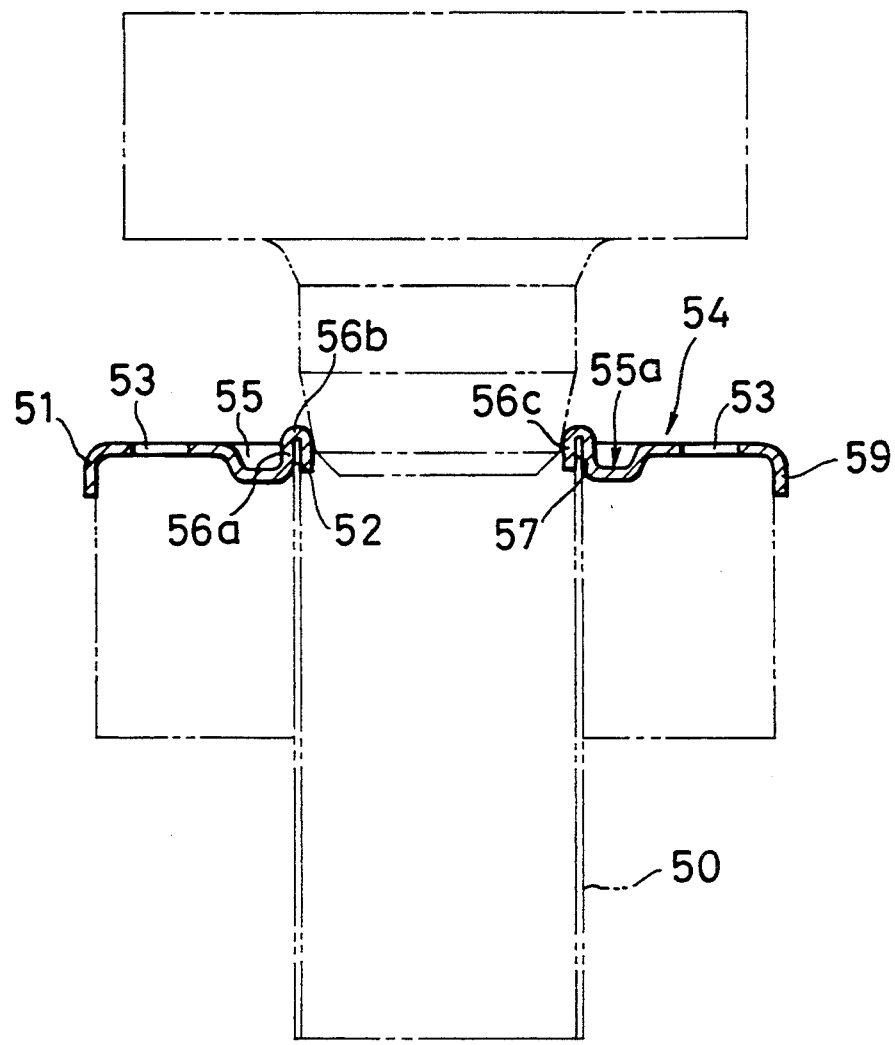
FIG. 12 is a longitudinal sectional view of a pipe flange which is drawn for the fabrication of a pipe with an integrated flange in accordance with a fifth embodiment of the present invention.
Figure 13:
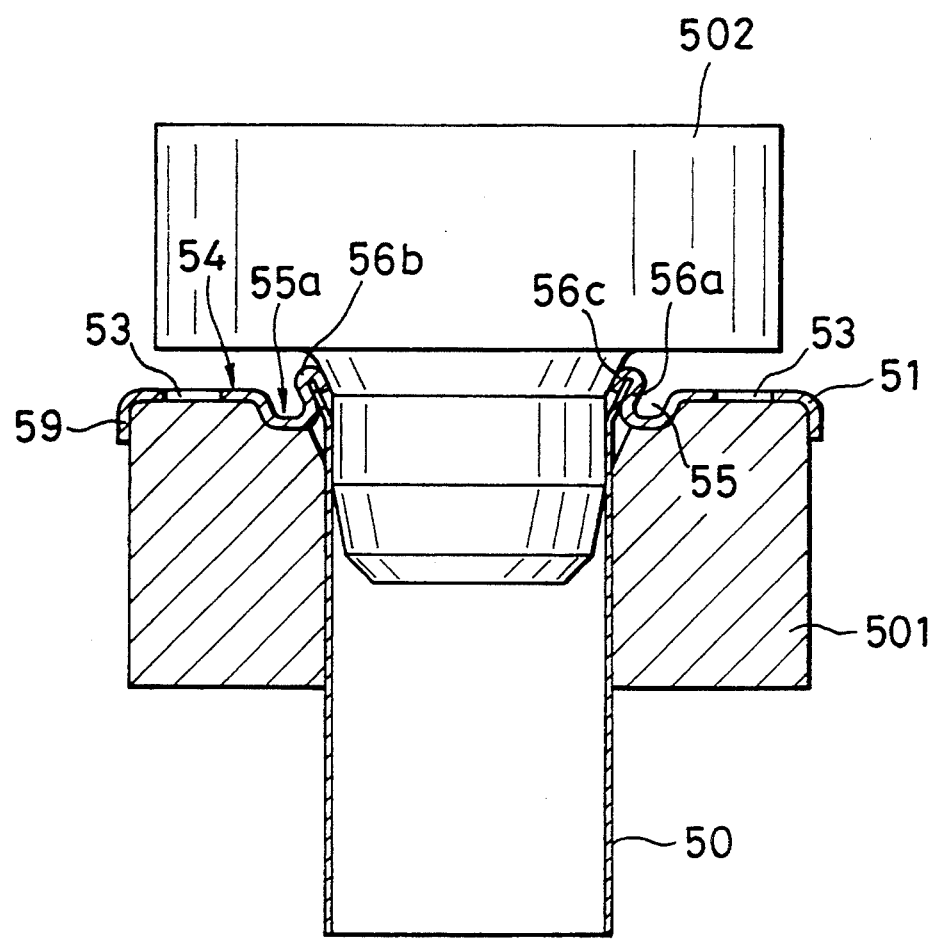
FIG. 13 is a longitudinal sectional view illustrating a step for joining a pipe flange in accordance with a fifth embodiment of the present invention with a pipe.
Figure 14:
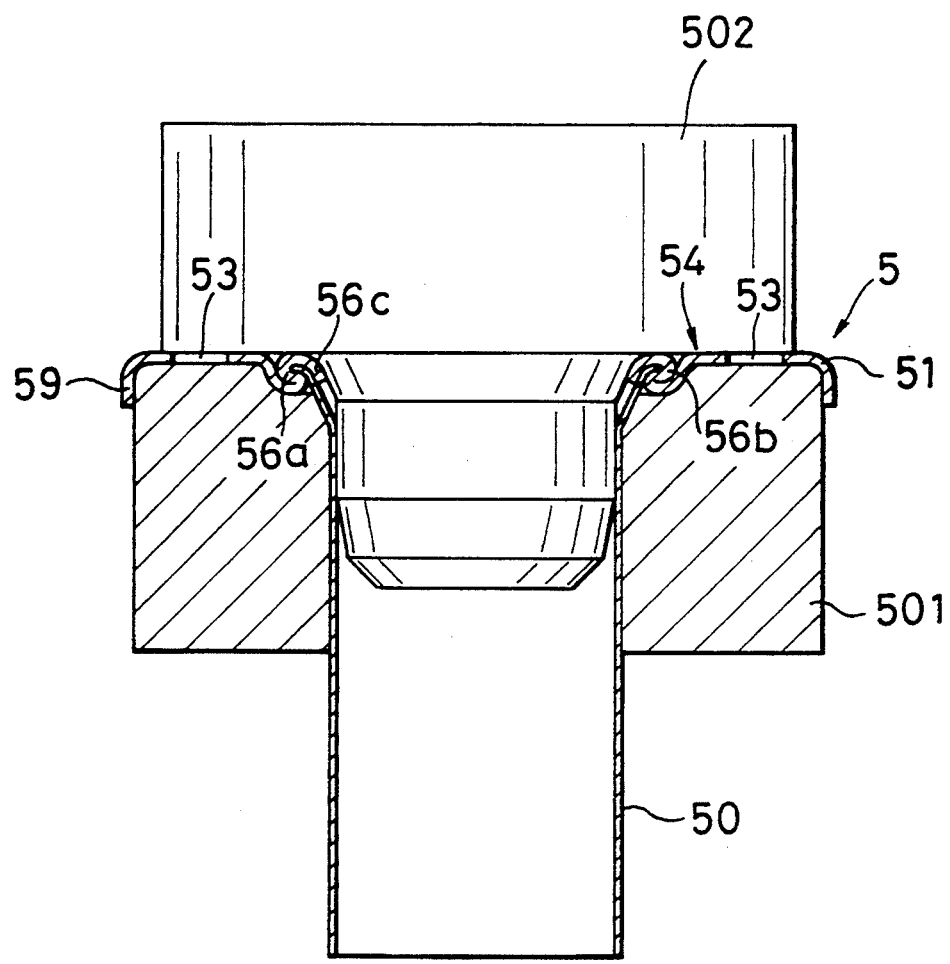
FIG. 14 is a longitudinal sectional view illustrating the last step for the fabrication of the pipe with the integrated flange in accordance with the fifth embodiment of the present invention.

Fifth Embodiment, FIGS. 12~14

In the case of the first, second, third or fourth embodiments, the thickness of the material of the flange 11, 21, 31 or 41 is relatively large so that a mechanical press used to punch and/or draw the pipe flange must have a high degree of pressure or force, but in case of a pipe flange fabricated from thin sheet metal, a mechanical or hydraulic press with a relatively low degree of pressure or force can be used. In the case of the fabrication of the automotive exhaust pipes and mufflers and other devices in which a liquid under a relatively low pressure flows, it is imperative to fabricate them especially light in weight. It follows therefore that it is very advantageous to fabricate the pipe flanges from thin sheet metal. The fifth embodiment of the present invention can satisfy such requirements as will be described in detail hereinafter with reference to FIGS. 12~14.

In the fifth embodiment the material and dimensions of a pipe 50 are same with those of the pipe 40 in the fourth embodiment, but a pipe flange 51 is fabricated from a SPHC hot-rolled low carbon steel sheet or strip as defined in JIS G 3131. The sheet or strip used is 2.6 mm in thickness, 600 mm in width. Such sheet or strip is punched into a chamfered rhombus shape with the major axis of 124 mm and the minor axis of 88 mm. Thus punched pipe flange blank is further punched to form two bolt holes 52 which are 10 mm in diameter and are spaced apart from each other by 92 mm from center to center. The outer periphery of thus fabricated pipe flange 51 is bent by 90 degrees to define a peripheral reinforcing rim 59 which extends downwardly by 10 mm. An opening 52 is punched at the center of the pipe flange 51 and an annular groove 55 is formed coaxially with the opening 52 and opens at the contact or joint surface 54 of the pipe flange 51. The bottom 55a of the annular groove 55 is in parallel with the contact or joint surface 54. The upper end portion of a cylindrical portion 56a formed between the opening 52 and the annular groove 55 is folded back at 56b downwardly and is spaced apart from the cylindrical portion 56a by 1.6 mm in the radially inward direction to define a pipe retaining portion 56c so that the upper end portion of the pipe 50 is fitted with clearance fit into an annular space 57 defined between the cylindrical and pipe retaining portions 56a and 56c.

After the upper end portion of the pipe 50 is fitted into the annular space 57 in the manner described above, a die 501 which securely holds the pipe 50 and the pipe flange 51 and a punch 502 are used in such a manner that the downwardly extended projection of the punch 502 is pushed into the pipe 50 as best shown in FIG. 13 so that the cylindrical portion 56a, the folding-back portion 56b, the pipe retaining portion 56c and the upper end portion of the pipe 50 inserted into the annular space 57 are all forced to expand radially outwardly of the pipe fitting opening 52.

When the punch 502 is further pushed into the pipe 50 in the axial direction thereof as best shown in FIG. 14, the upper end portion inserted into the annular space 57 of the pipe 50, the flared cylindrical portion 56a, the folding-back portion 56b and the pipe retaining portion 56c are further radially outwardly to press against the bottom 55a of the annular groove 55. Thus, the pipe with the integrated flange which is generally indicated by the reference numeral 5 and in which the upper end portion of the pipe is inserted into the annular space 57 of the pipe 50, the cylindrical portion 56a, the folding-back portion 56b and the folded-back pipe retaining portion 56c are securely seamed, can be obtained.

The test machine described above was used to measure the strength of the joint between the pipe 50 and the pipe flange 51 in a manner substantially similar to that described above by continuously measuring the relationship between the static load applied to the pipe with the integrated flange 5 and the displacement thereof. The results of the tests are as follows. Even when the static load applied to the pipe with the integrated flange 5 becomes in excess of the elastic limits of the pipe 50 and the pipe flange 51, the displacement of the pipe 50 increases smoothly as the static load is increased and the sudden change representative of yielding phenomenon is not observed: Furthermore, while the static load was increased, the phenomenon that the seamed joint between the pipe 50 and the pipe flange 51 was loosened so that the pipe 50 slided with respect to the pipe flange 51 was not clearly observed. The drawing resistance was 1.722~1.765 times as high as the elastic limits of the pipe 50 and the pipe flange 51 and more specifically 258.5 kgf~296.4 kgf. When the displacement of the pipe 50 approached 35 mm~46 mm, the ratio between the increase in displacement and the decrease in static load became relatively higher and then the remarkable deformation of the upper end portion of the pipe 50 occurred so that the pipe 50 was drawn out of the pipe flange 51. In summary, even though the fifth embodiment has the features substantially similar to those of the first embodiment, it exhibits a high drawing resistance so that it has been confirmed that the fifth embodiment is used not only to flow a liquid therethrough but also to fabricate structural component parts. As described above, in the fifth embodiment, the pipe flange 51 which is fabricated from thin sheet metal or metal strip is used so that the fifth embodiment is very advantageous especially when workability must be improved, the product quality must be maintained at a desired level and the products must be made light in weight as in the case of the automotive manufacture.

The present invention is not limited to be used to flow a liquid and can be satisfactorily used to fabricate the pipes with the integrated flange which can be used as mechanical structural component parts such as the upper end members and anchor bases of the pipe supports which are temporary structures for building or construction works, free access floors in computer rooms, tie bolt collars for molds for reinforced concrete structures and the like. In these cases, it is preferable to use the pipe flange 51 fabricated from sheet metal having a relatively greater thickness and the pipe 50 having a relatively greater wall thickness. However, it is not necessary to form the reinforcing rim 59 along the periphery of the pipe flange 51. Furthermore, the present invention is applied to the fabrication of a pipe integral with a flange consisting of an aluminum pipe and an aluminum alloy pipe flange and a pipe integral with a flange consisting of a pipe and a pipe flange fabricated from titanium, tantalum, other metals or their alloys. Moreover, a pipe can be fabricated from a certain metal or alloy while a pipe flange can be fabricated from a metal or alloy different from the material of the pipe. And further modifications can be made without being apart from the true spirit of the present invention.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A pipe integral with a flange, comprising:

a cylindrical pipe having an end; and a pipe flange having a first surface and a second surface spaced from the first surface, wherein an opening is defined through the pipe flange extending from the first surface to the second surface, and the pipe is secured within the opening extending outwardly from the second surface of the pipe flange, the pipe flange further including a generally conical portion extending substantially parallel to the end of the pipe in a direction toward the first surface, a folded back portion extending from the generally conical portion and folded inwardly around and into the end of the pipe, a pipe retaining portion extending from the folded back portion substantially parallel to the generally conical portion in a direction toward the second surface and defining an annular groove therebetween, and an annular depression adjacent the generally conical portion open to the first surface and having a contact surface flaring outwardly from the opening, wherein upon assembly, the end of the pipe is clamped in the annular groove within the annular depression and is flush with the first surface of the pipe flange.

2. A pipe integral with a flange as claimed in claim 1, further characterized in that said pipe flange is fabricated from sheet metal by a sheet metal machine.

3. A pipe integral with a flange as claimed in claim 1, further characterized in that said contact surface is a frustoconical surface having a constant taper angle.

4. A pipe integral with a flange as claimed in claim 2, further characterized in that said contact surface is a frustoconical surface having a constant taper angle.

5. A pipe integral with a flange as claimed in claim 1, further characterized in that said contact surface consists of a plurality of merged frustoconical surfaces with different taper angles respectively, which are made smaller in the direction toward said generally conical portion of said pipe flange.

6. A pipe integral with a flange as claimed in claim 2, further characterized in that said contact surface consists of a plurality of merged frustoconical surfaces with different taper angles respectively, which are made smaller in the direction toward said generally conical portion of said pipe flange.

7. A pipe integral with a flange as claimed in claim 1, further characterized in that said contact surface is a convex curved surface whose radius of curvature is increased in the direction toward said generally conical portion of said pipe flange.

8. A pipe integral with a flange as claimed in claim 2, further characterized in that said contact surface is a convex curved surface whose radius of curvature is increased in the direction toward said generally conical portion of said pipe flange.

9. A pipe integral with a flange as claimed in claim 1, further characterized in that said contact surface has a radially inwardly extending step whose upper surface is substantially perpendicular to a central longitudinal axis of said pipe.

10. A pipe integral with a flange as claimed in claim 2, further characterized in that said contact surface has a radially inwardly extending step whose upper surface is substantially perpendicular to a central longitudinal axis of said pipe.

11. A pipe integral with a flange, the combination comprising:

a pipe having an end that is annular; and a pipe flange defining an annular opening in which the end of the pipe is secured, including a generally conical portion extending substantially parallel to the end of the pipe and forming an edge of the opening, a folded back portion extending from the generally conical portion and folded inwardly around and into the end of the pipe, a pipe retaining portion extending from the folded back portion substantially parallel to the generally conical portion and defining an annular groove therebetween, and an annular depression adjacent the generally conical portion having a contact surface flaring outwardly from the opening, wherein upon assembly, the end of the pipe is clamped in the annular groove between the generally conical portion and the pipe retaining portion, and wherein the generally conical portion, the pipe retaining portion, and the pipe clamped therebetween are folded back against the annular depression and expanded radially outwardly with the generally conical portion abutting the contact surface of the annular depression.

12. A pipe integral with a flange as claimed in claim 4, further characterized in that said pipe and said pipe flange are fabricated from sheet metal by sheet metal machines, respectively.

13. A pipe integral with a flange as claimed in claim 11, further characterized in that the end of said pipe is inserted with clearance or transition fit into said annular groove defined between said generally conical portion and said pipe retaining portion before assembly.

14. A pipe integral with a flange as claimed in claim 11, further characterized in that the surface of said annular depression is frustoconical with a taper angle.

15. A pipe integral with a flange as claimed in claim 12, further characterized in that the surface of said annular depression is frustoconical with a taper angle.

16. A pipe integral with a flange as claimed in claim 11, further characterized in that the surface of said annular depression is a stepped frustoconical surface consisting of a plurality of frustoconical surfaces with different taper angles which become smaller as said stepped frustoconical surface approaches the bottom of said annular depression.

17. A pipe integral with a flange as claimed in claim 12, further characterized in that the surface of said annular depression is a stepped frustoconical surface consisting of a plurality of frustoconical surfaces with different taper angles which become smaller as said stepped frustoconical surface approaches the bottom of said annular depression.

18. A pipe integral with a flange as claimed in claim 11, further characterized in that the surface of said annular depression is a convex curved surface whose radius of curvature increases as said surface approaches the bottom of said annular depression.

19. A pipe integral with a flange as claimed in claim 12, further characterized in that the surface of said annular depression is a convex curved surface whose radius of curvature increases as said surface approaches the bottom of said annular depression.

20. A pipe integral with a flange as claimed in claim 11, further characterized in that said surface has a radially inwardly extending step whose upper surface is substantially perpendicular to a central longitudinal axis of said pipe.

21. A pipe integral with a flange as claimed in claim 12, further characterized in that said surface has a radially inwardly extending step whose upper surface is substantially perpendicular to a central longitudinal axis of said pipe.

22. A method for integrally joining a pipe with a pipe flange comprising the steps of:

providing a pipe flange having an opening for receiving the end of a pipe, the pipe flange including a cylindrical portion forming an edge of the opening, a folded back portion extending from the cylindrical portion and folded inwardly with respect to the opening, a pipe retaining portion extending from the folded back portion generally parallel to the cylindrical portion and defining an annular groove therebetween, and an annular depression adjacent the cylindrical portion having a surface flaring outwardly from the opening;

inserting the end of the pipe into the opening in the pipe flange and into the annular groove between the cylindrical portion and the pipe retaining portion; and pressing the pipe retaining portion and the folded back portion downwardly and outwardly with respect to the opening so that the cylindrical portion flares and abuts and conforms to the surface of the annular depression and the pipe end is radially expanded outwardly.

23. A method for joining a pipe with a pipe flange as claimed in claim 22, further comprising the step of fabricating the pipe flange from sheet metal by a sheet metal machine.

24. A method for joining with a pipe with a pipe flange as claimed in claim 22, further characterized in that in the step for inserting the end of the pipe into the annular groove, a transition or clearance fit is effected.

25. A method for joining with a pipe with a pipe flange as claimed in claim 23, further characterized in that in the step for inserting the end of the pipe into the annular groove, a transition or clearance fit is effected.

26. A method for joining a pipe with a pipe flange as claimed in claim 22, wherein the step of providing the pipe flange includes forming the annular depression as a frustoconical surface with a constant taper angle.

27. A method for joining a pipe with a pipe flange as claimed in claim 23, wherein the step of providing the pipe flange includes forming the annular depression as a frustoconical surface with a constant taper angle.

28. A method for joining a pipe with a pipe flange as claimed in claim 22, wherein the step of providing the pipe flange includes forming the annular depression as a stepped frustoconical surface consisting of a plurality of frustoconical surfaces with different taper angles, respectively, which decrease as the stepped frustoconical surface approaches the bottom of the annular depression.

29. A method for joining a pipe with a pipe flange as claimed in claim 23, wherein the step of providing the pipe flange includes forming the annular depression as a stepped frustoconical surface consisting of a plurality of frustoconical surfaces with different taper angles, respectively, which decrease as the stepped frustoconical surface approaches the bottom of the annular depression.

30. A method for joining a pipe with a pipe flange as claimed in claim 22, wherein the step of providing the pipe flange includes forming the annular depression as a convex curved surface whose radius of curvature is increased as the radially outward surface approaches the bottom of the annular depression.

31. A method for joining a pipe with a pipe flange as claimed in claim 23, wherein the step of providing the pipe flange includes forming the annular depression as a convex curved surface whose radius of curvature is increased as the radially outward surface approaches the bottom of the annular depression.

32. A method for joining a pipe with a pipe flange as claimed in claim 22, wherein the step of providing the pipe flange includes forming the annular depression as a stepped surface with at least one radially inwardly extending step having an upper surface substantially perpendicular to a central longitudinal axis of the pipe.

33. A method for joining a pipe with a pipe flange as claimed in claim 23, wherein the step of providing the pipe flange includes forming the annular depression as a stepped surface with at least one radially inwardly extending step having an upper surface substantially perpendicular to a central longitudinal axis of the pipe.

* * * * *